May 25, 1954   J. R. GALLAGHER   2,679,602
MOTOR AND HEATER CONTROL SYSTEM
Filed Feb. 18, 1952   2 Sheets-Sheet 1
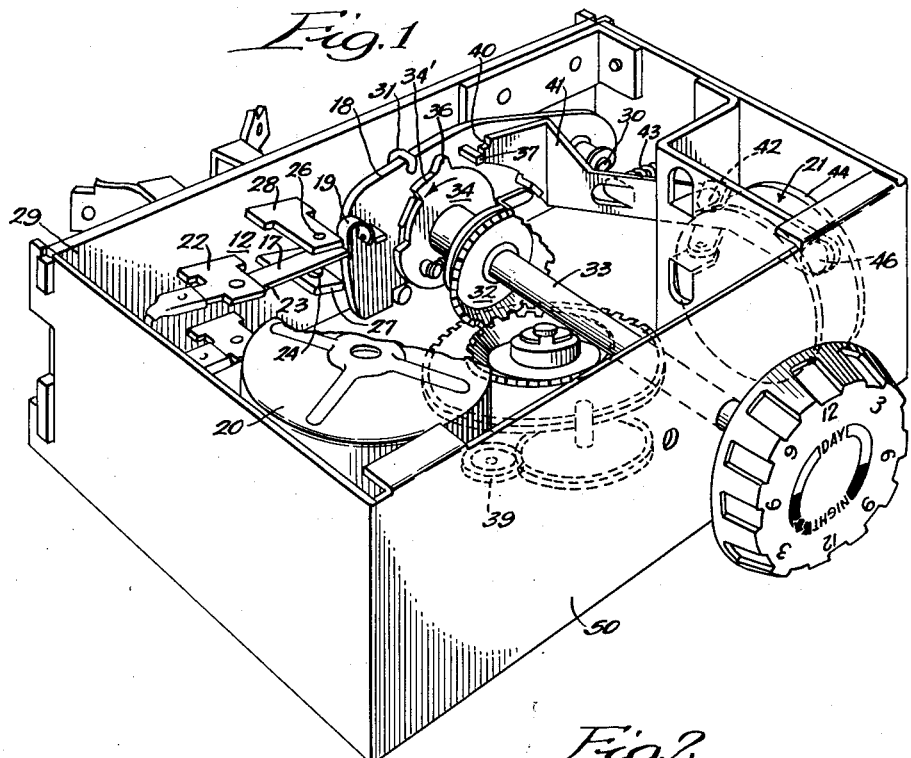
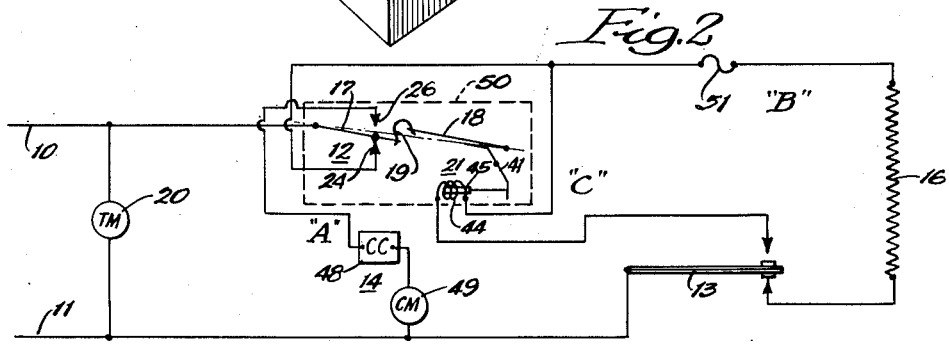
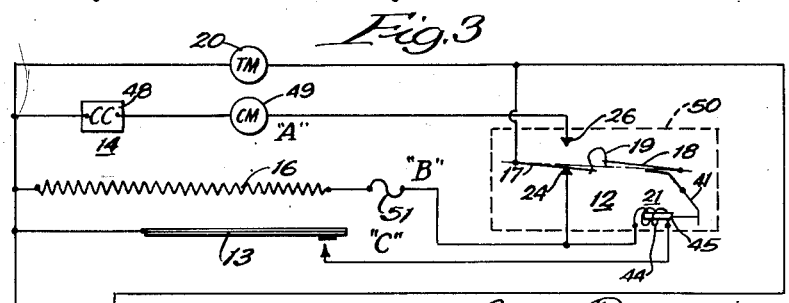
INVENTOR:
John Raymond Gallagher,
BY
Brown, Jackson, Boettcher & Dienner
ATTORNEYS.

May 25, 1954   J. R. GALLAGHER   2,679,602
MOTOR AND HEATER CONTROL SYSTEM
Filed Feb. 18, 1952   2 Sheets-Sheet 2

INVENTOR:
John Raymond Gallagher,
BY
Brown, Jackson, Butteln, & Dunner
ATTORNEYS.

Patented May 25, 1954

2,679,602

UNITED STATES PATENT OFFICE 2,679,602

MOTOR AND HEATER CONTROL SYSTEM

John Raymond Gallagher, River Forest, Ill., assignor to International Register Company, Chicago, Ill., a corporation of Illinois Application February 18, 1952, Serial No. 272,218

1 Claim. (Cl. 307—39)

This invention relates to an electrical circuit arrangement for use in actuating various electrical mechanisms, more particularly mechanisms of the type employed to control the accelerated defrosting of refrigerators.

According to the present trend, in practically all refrigerators for home or limited commercial use, where the refrigerator may be said to be a self-contained, portable unit, provision is made for automatic defrosting. The preferred practice not only involves the temporary idling of the refrigerating mechanism but the use of an auxiliary heating means to accelerate the required temperature changes in the evaporator plates of the cold producing unit. This requisite temporary idling of the refrigerating mechanism and the energization of an auxiliary heating means usually is effected by a timing motor actuating an electric switch for controlling alternate circuits involving this respective mechanism and means.

The timing motor is made to effect the shifting of the switch periodically within a certain interval of time. However, conditions within the refrigerator with the refrigerating mechanism itself, or within the room where the refrigerator is located determine the need for defrosting. By reason of this fact, the period for effecting a satisfactory periodic defrosting may vary from time to time.

Obviously, the construction of the time motor has to be such as to restore the normal functioning of the refrigerating mechanism after a fixed period of time. Often, this period of time might be too long and over-extend the defrosting period, with a consequent possibility of overheating the interior of the refrigerator and a resulting deterioration of food. Accordingly, it became necessary to supplement the time motor with means, controlled by the temperature condition of the evaporator plates, to restore the normal operation of the refrigerating mechanism—and idle an auxiliary heating means—independently of the time motor. This usually is effected by a switch-restoration means activated by a thermostat, as influenced by the temperature conditions of or caused by the evaporator plates. A number of problems have been encountered in providing this supplemental switch-restoration means. One of these problems has been the humming of the switch-shifting electromagnet when connected in series with the defrost heater and thermal control.

The main objects of this invention, therefore, are to provide an improved circuit arrangement for use in effecting the opposite shifting of the switch by electrically-activated mechanical means; to provide an improved circuit arrangement of this kind permitting the opposite shifting of the switch to be effected by a time-operated means and by a thermally-controlled electromagnetic means respectively; and to provide an improved circuit arrangement of this kind which is particularly adapted for use with refrigerator units for periodically cutting off the normally-operating refrigerating mechanism and temporarily cutting in the defrost-accelerating means, and permitting the refunctioning of the refrigerating mechanism to be dependent on temperature conditions within the refrigerator.

In the accompanying drawings:

Fig. 1 is a perspective view of one form or adaptation of a time-motor and electromagnet switch-operating mechanism for use in a circuit arrangement embodying this invention;

Fig. 2 is a diagram of a circuit arrangement embodying this invention and employing one type of thermostat for controlling the electromagnet of the switch-operating mechanism shown in Fig. 1, the circuit-controlling switch being shown in its "defrost" position;

Fig. 3 is a similar diagrammatic view employing another type of thermostat for controlling the electromagnet of the switch-operating mechanism such as shown in Fig. 1;

Figure 4:
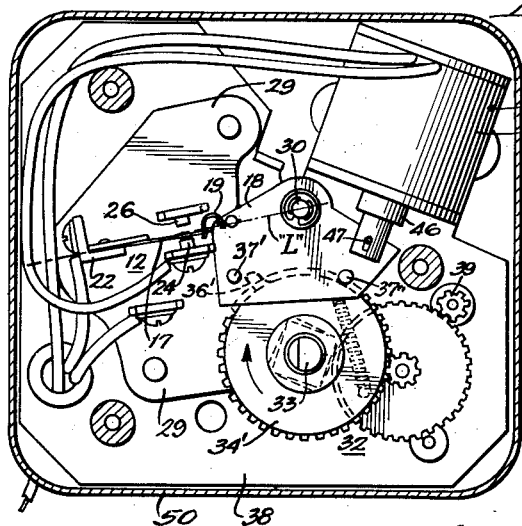
Fig. 4 is a plan view (with a housing in cross-section) of another form of time-motor and electromagnet switch-operating mechanism for use in a circuit arrangement embodying this invention, the circuit-controlling switch being shown in its defrost position.
Figure 6:
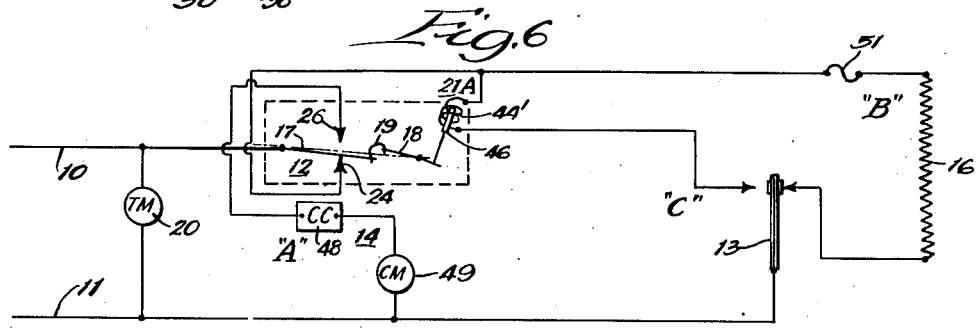
Figure 7:
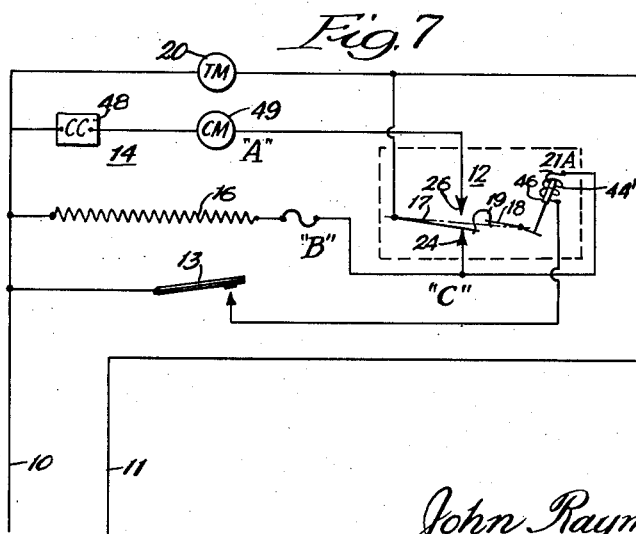

Fig. 6 is a diagram of a circuit arrangement embodying this invention and employing one type of thermostat for controlling the electromagnet of the switch-operating mechanism shown in Fig. 4, the circuit-controlling switch being shown in its defrost position; and Fig. 7 is a similar diagrammatic view employing another type of thermostat switch for controlling the electromagnet of a switch-operating mechanism such as shown in Fig. 4.

The distinctive concept of this invention involves a circuit arrangement having several branches, in one of which is arranged an electromagnet controlled by a thermostat for effecting one movement of a switch arm which controls the operative condition of the other branches. The arrangement is especially adapted for use with a refrigerator defrosting control wherein a spring-tensioned, overcenter switch arm, shifted in one direction by a time-controlled means, is restored to its pre-shifted position by a momentary energization of the electromagnet through the closing of the circuit by the thermostat.

A circuit arrangement embodying this concept comprises the three circuits A, B, and C connected in parallel by leads 10 and 11 to a source of electrical energy (not shown) and employing a dual-motor-operated switch mechanism 12 and a thermostat 13 for controlling the alternate operation of a refrigerating mechanism 14 and a defrost accelerating means 16 included respectively in the circuits A and B.

Two adaptations of switch mechanism 12, very suitable for use in a circuit arrangement embodying this invention, are being shown, each comprising a switch arm 17 oppositely shifted by a rocker 18 connected thereto by an overcenter snap spring 19 which is selectively or oppositely controlled by a continuously operating timing motor 20 and an intermittently energized electromagnet or solenoid motor 21 or 21A. These two switch adaptations are also illustrated and described in the copending application of William P. Gallagher, Anthony D. Stolle and Paul G. Bielik, Serial No. 222,238, filed April 21, 1951. Acccordingly, only a general description of each will be made herein, since this invention relates to a circuit arrangement wherewith such switches may be employed.

The switch arm 17 is preferably a piece of spring material anchored to a terminal post 22, so that the spring flexes at the hinge point 23 as the free end moves between the contacts 24 and 26 on the terminal posts 27 and 28. The terminal posts 22, 27 and 28 are suitably secured to an insulating plate 29 and so disposed as to align the plane of the switch arm 17, at its anchorage to the terminal 22, with the axis of a mounting post 30 for the rocker 18. The rocker 18 is a block of insulating material swingably mounted on the post 30.

The overcenter spring 19 is substantially U-shaped and is hingedly secured to the adjacent ends of the switch arm 17 and the rocker 18 in a well-known manner. When that end of the spring 19 which is connected to the rocker 18, moves over the center line L (see Fig. 4) in one direction the opposite end of the spring 19 connected to the switch arm 17 snaps over the line L in the opposite direction. Thus, a quick make and break is effected with the contacts 24 and 26.

The motor 20 is a conventional synchronous motor whose internal gearing is arranged to cause the gearing 32 to drive a shaft 33 at the required speed, as has been clearly set forth in the afore-mentioned copending applications. (A motor 20 is not shown in Fig. 4 but it will be understood that one is secured to the under side of the mounting 38 to drive the pinion 39.)

In the Fig. 1 adaptation the rocker 18 is normally urged by a spring 31 to shift the switch arm 17 to close circuit A to the refrigerating mechanism 14, as will be set forth more fully presently. The shaft 33 mounts a delayed-action cam means 34, of a construction set forth in the aforesaid application Serial No. 222,238, for actuating the rocker 18 in one direction against the action of the spring 31. An offset projection 36 on the cam 34 periodically contacts a pin 37 on the rocker 18 and elevates it so as to reverse the position of the switch arm 17. The rocker 18 is held in its cam-shifted position by the engagement of a shoulder 40 on a lever 41 with the pin 37. The lever 41 is hinged at 42 and biased by a spring 43 to position the shoulder 40 in the path of the rocker pin 37.

The electromagnet or solenoid type of control motor indicated at 21, has the coil 44 of this motor connected in the circuit C. The end of the lever 41 carries an armature element 46 which is adapted to be attracted magnetically toward the core of the electromagnet so that when the coil 44 is energized the armature 46 attracts the lever 41 against the action of the spring 43 and releases the rocker 18, as more fully set forth in copending application Serial No. 222,238.

Figure 5:
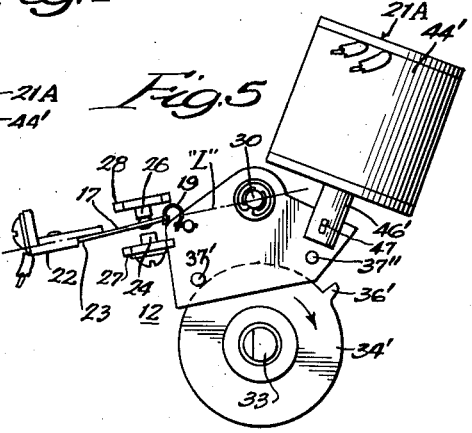
Fig. 5 is a fragmentary view, showing these switch parts and the operating mechanism oppositely positioned from that shown in Fig. 4, i. e. in refrigerating position.

In the adaptation shown in Figs. 4 and 5 the rocker 18 is retained by the overcenter spring 19 in the opposite positions to which it is shifted by the timing motor (not shown, as explained above) and the solenoid 21A. The shaft 33 mounts a delayed-action cam means 34', of a construction set forth in the aforesaid application Ser. No. 222,238, for actuating the rocker 18 in opposite directions against the overcenter snap spring 19. It, therefore, is necessary for the cam means 34' to act on a pair of pins 37' and 37" carried by the rocker 18, whereby the rocker is oppositely actuated by the cam projection 36'. The engagement of the pin 37' by the cam projection 36' results in a shifting of the rocker 18 to reverse the switch arm 17 so as to open the circuit A to the refrigerating mechanism 14 and close the circuit B to the defrost accelerating heater 16. The pin 37" serves a dual purpose. In the first place it limits the throw of the rocker 18 by the action of the cam projection 36' on the pin 37'. In the second place it insures a subsequent reverse shifting of the rocker 18 by the cam projection 36' in the event a reverse shifting of the rocker 18 has not been effected by the solenoid motor 21A. Thus, if after a shift of the rocker 18 to open the circuit A and close the circuit B there should be a failure of the solenoid motor 21A, there will be a mechanical restoration of the switch mechanism 12 to insure the normal functioning of the refrigerating mechanism 14. The circumferential spacing of the projections 37' and 37", of course, will have to be correlated with the speed of rotation of the cam 34' as determined by its time motor gearing arrangement.

In this solenoid adaptation the armature 46' is movable relative to the solenoid winding 44' and is connected at its other end directly to the rocker 18 by a slot and pin arrangement 47. This slot and pin allows for a bit of free movement to permit a shifting of the rocker 18 by the cam 34' when the armature 46' is in its gravity-dependent position during the deenergization of the coil 44'.

All of the above described parts of the switch mechanism 12 and the operating motors 20 and 21 or 21A, of either adaptation, are compactly enclosed in a suitable housing 50, as shown in Figs. 1 and 6 and diagrammatically indicated by dotted lines in Figs. 2, 3, 6 and 7.

The thermostat 13, typically shown as being of the bimetallic type, may be either a conventional single-pole double-throw switch, as shown in Figs. 2 and 6, or a single-pole single-throw switch as shown in Figs. 3 and 7. In either case the thermostat 13 is arranged to control circuit C to the solenoid motor 21 or 21A and is so placed in the refrigerator as to be influenced by the overall temperature conditions created by the cold producing thermal unit forming a part of the refrigerating mechanism 14 and as effected by heat-creating thermal unit 16, as presently will be explained. These two types of thermostats 13, used in a circuit constructed in accordance with this invention, have their respective advantages. The single-pole double-throw type, as shown in Figs. 2 and 6, opens the circuit B to the heater 16 independently of the functioning of the electromagnet 21 or 21A. Thus, if this electromagnet became inoperative the heater 16 would be cut out notwithstanding. The single-pole single-throw type of thermostat 13, as shown in Figs. 3 and 7, has the advantage of economy in manufacture.

The conventional refrigerating mechanism 14 includes the cold producing or thermal unit in the form of the usual evaporator plates (not shown), the "Cold Control" 48 responsive thereto, and the compressor motor 49, the latter being connected in the circuit A.

The heater 16 is a conventional resistance coil connected in the circuit B and positioned in the refrigerator juxtaposed to the evaporator plates so as to rather quickly increase the temperature conditions when the coil 16 is cut in and the refrigerating mechanism 14 cut out by the shift of the switch arm 17—to effect the desired defrosting of the refrigerator. A suitably-constructed fuse 51, for positioning in the refrigerator to be influenced by temperatures created by the heater 16, also is included in the circuit B so that should the motors 20 and/or 21 or 21A fail for some reason, following a shift of the switch arm 17 to cut out the refrigerating mechanism 14 and cut in the heating coil 16, the circuit B will be opened and thus prevent an excessive overheating of the refrigerator.

The operation of an improved circuit arrangement embodying this invention, for either adaptation of switch mechanism 12 and either type of thermostat 13, is practically identical. Normally the switch arm 17 is set so as to close the circuit A to the refrigerating mechanism 14, thus causing the normal functioning of the refrigerator. In the adaptation shown in Fig. 1 the switch arm 17 is held in this normal position by the biasing spring 31 acting on the rocker 18. In the adaptation shown in Fig. 4 the switch arm 17 is held in the normal position by the overcenter snap spring 19. Periodically the motor 20 moves the cam means 34 or 34' to actuate the rocker 18 and reverse the switch arm 17, thereby opening the circuit A so as to shut off the refrigerating mechanism 14 and close the circuit B so as to cut in the defrost-accelerating heater 16.

The thermostat 13 is so constructed and disposed with respect to the evaporator plates of the thermal unit that if the refrigerating mechanism is operating, the thermostat normally holds open the circuit C. As soon as the stopping of the refrigerating mechanism 14 and the energization of the heater 16 has created a higher-than-normal minimum temperature condition within the evaporator plates—or within the refrigerator—the thermostat 13 is shifted to close the circuit C. This results in an energization of the coil 44 (or 44') of the solenoid motor 21 (or 21A) with a consequent actuation of the armature 46 or 46' and a restoration of the switch arm 17 to its normal position, opening the circuit B, and closing the circuit A to the refrigerating mechanism 14 so that it resumes its normal operation. In the switch-mechanism adaptation shown in Fig. 1, the energization of the electromagnet coil 44 retracts the lever 41 so as to disengage the shoulder 40 from the rocker pin 37 and permit the spring 31 to depress the rocker 18. In the switch-mechanism adaptation shown in Figs. 4 and 5 the energization of the solenoid coil 44' causes the resulting movement of the armature 46' to actuate the rocker 18 so as to reverse the shift of the switch arm 17 against the overcenter snap spring 19. In either case the switch mechanism 12, being restored to its normal functioning position, remains so until the next engagement of the cam projection 36 or 36' with the rocker pin 37 or 37' as caused by the functioning of the timing motor 20. A special feature of this circuit arrangement provides for the momentary functioning of the electromagnet by reason of the fact that the circuit to the electromagnet is cut out by the shifting of the switch mechanism 16 as effected by the electromagnet. That is to say, when the electromagnet is operated to shift the defrosting control switch back to its original position, the electromagnet instantly breaks its own circuit at switch contact 24. Thus, there is no long interval of energization of the electromagnet, with attendant objectionable hum.

While preferred embodiments of the invention have been illustrated and described, it will be understood that such are merely exemplary and that numerous modifications and rearrangements may be made therein without departing from the essence of the invention.

I claim:

In apparatus of the class described wherein an electric motor and an electric heater are adapted to be energized alternately from an alternating current supply source in a predetermined control cycle, the combination therewith a pivoted rocker, a movable switch blade, an overcenter snap spring connecting said rocker to said switch blade for moving the latter from a first position in engagement with a first contact which is adapted to energize the circuit to said electric motor, into a second position in engagement with a second contact which is adapted to energize a circuit to said heating element, first and second angularly spaced pins on said rocker, a continuously rotating time driven wheel having a cam surface thereon adapted to contact the first of said pins for tilting the rocker in one direction and thereby snapping said switch blade from said first position to said second position, said cam surface thereafter contacting the second of said pins a predetermined time interval later for tilting said rocker in the other direction and thereby snapping said switch blade back to said first position, a solenoid comprising a winding and a core responsive thereto, said core being operatively connected with said rocker and adapted upon energization of said winding to actuate said rocker in the direction for snapping said switch blade from said second position back to said first position, a thermostatic switch responsive to temperatures created by said electric heater and adapted to interrupt the operation of the heater if a predetermined temperature is attained before said cam surface engages the second of said pins, and circuit connections between said heater, said switch blade and contacts, said solenoid winding and said thermostatic switch arranged whereby when said switch blade is actuated into its second position said heater is energized through a circuit separate from the winding of said solenoid so as to avoid alternating current hum in the solenoid winding during the interval that said heater is energized, and whereby when said thermostatic switch responds to said predetermined temperature said solenoid winding is rendered effective momentarily to actuate said switch blade from said second position back into said first position, in which first position said switch blade interrupts the current supply to said solenoid.

References Cited in the file of this patent

UNITED STATES PATENTS

| Number | Name | Date |
|---|---|---|
| 1,913,433 | Doble | June 13, 1933 |
| 2,114,766 | Heitman | Apr. 19, 1938 |
| 2,313,390 | Newton | Mar. 9, 1943 |
| 2,551,163 | Rickert | May 1, 1951 |
| 2,601,466 | Thomas | June 24, 1952 |